United States Patent
Zhou et al.

(10) Patent No.: US 11,556,541 B2
(45) Date of Patent: Jan. 17, 2023

(54) DATA QUERY METHOD, APPARATUS AND DEVICE

(71) Applicant: Alibaba Group Holding Limited, Grand Cayman (KY)

(72) Inventors: Xiang Zhou, Hangzhou (CN); Bing Li, Beijing (CN); Yongchun Zhao, Hangzhou (CN); Shaojin Wen, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 17/035,276

(22) Filed: Sep. 28, 2020

(65) Prior Publication Data
US 2021/0011916 A1      Jan. 14, 2021

Related U.S. Application Data

(63) Continuation of application No. PCT/CN2019/078418, filed on Mar. 18, 2019.

(30) Foreign Application Priority Data

Mar. 29, 2018 (CN) .......................... 201810268968.0

(51) Int. Cl.
*G06F 16/00* (2019.01)
*G06F 16/2455* (2019.01)
(Continued)

(52) U.S. Cl.
CPC .... *G06F 16/24553* (2019.01); *G06F 16/2282* (2019.01); *G06F 16/248* (2019.01); *G06F 9/5027* (2013.01); *G06F 2209/5011* (2013.01)

(58) Field of Classification Search
CPC ........... G06F 16/2282; G06F 16/24553; G06F 16/2471; G06F 16/248; G06F 2209/5011;
(Continued)

(56) References Cited

U.S. PATENT DOCUMENTS

| 7,062,768 B2 | 6/2006 | Kubo et al. |
| 7,669,029 B1 | 2/2010 | Mishra et al. |

(Continued)

FOREIGN PATENT DOCUMENTS

| CN | 102360314 A | 2/2012 | |
| CN | 105653572 A * | 6/2016 | ......... G06F 16/2455 |

(Continued)

OTHER PUBLICATIONS

Translation of International Search Report dated Jun. 21, 2019, from corresponding PCT Application No. PCT/CN2019/078418, 2 pages.

(Continued)

*Primary Examiner* — Michelle N Owyang
(74) *Attorney, Agent, or Firm* — Lee & Hayes, P.C.

(57) ABSTRACT

A method including obtaining resource overheads according to feature information of a received query request; according to the resource overheads and a compute node resource, dynamically adjusting a compute node in a resource pool; and querying, by using the compute node, data corresponding to the query request. A compute node in a resource pool may be dynamically adjusted, so that the compute node in the resource pool may process all the received query requests, and therefore, the processing efficiency and a resource utilization rate of the compute node are more effectively improved, such that the compute node may more efficiently perform parallel processing on the multiple query requests, and the utilization rates of a CPU resource, a memory resource and a network bandwidth resource are increased, thus achieving better effect from the perspectives of overall computing resource and user query load and improving the usage experience of a user.

20 Claims, 6 Drawing Sheets

(51) Int. Cl.
*G06F 16/22* (2019.01)
*G06F 16/248* (2019.01)
*G06F 9/50* (2006.01)

(58) Field of Classification Search
CPC ...... G06F 9/5027; G06F 9/505; G06F 9/5077; G06F 9/5083
USPC .................................................. 707/600–899
See application file for complete search history.

(56) References Cited

U.S. PATENT DOCUMENTS

| | | | |
|---|---|---|---|
| 8,112,443 | B2 | 2/2012 | Hutchison et al. |
| 8,209,695 | B1 | 6/2012 | Pruyne et al. |
| 8,479,211 | B1* | 7/2013 | Marshall ............... G06F 16/134 718/104 |
| 8,849,749 | B2 | 9/2014 | Rishel et al. |
| 9,164,689 | B2 | 10/2015 | O'Brien et al. |
| 9,489,222 | B2 | 11/2016 | Zlotkin |
| 9,846,600 | B1 | 12/2017 | Williams et al. |
| 10,405,328 | B2 | 9/2019 | Corroy et al. |
| 10,853,367 | B1* | 12/2020 | Miller ............... G06F 16/24545 |
| 2003/0069916 | A1 | 4/2003 | Hirschsohn |
| 2005/0055694 | A1 | 3/2005 | Lee |
| 2007/0271570 | A1 | 11/2007 | Brown et al. |
| 2011/0246434 | A1 | 10/2011 | Cheenath et al. |
| 2013/0205028 | A1* | 8/2013 | Crockett ............... G06F 9/5027 709/226 |
| 2016/0063029 | A1* | 3/2016 | Mu ..................... H04L 67/1097 707/620 |
| 2016/0188594 | A1 | 6/2016 | Ranganathan |
| 2017/0213257 | A1* | 7/2017 | Murugesan ........ G06Q 30/0275 |
| 2018/0060394 | A1 | 3/2018 | Gawande et al. |
| 2018/0349202 | A1* | 12/2018 | Sharma ................. G06F 9/5077 |

FOREIGN PATENT DOCUMENTS

| | | |
|---|---|---|
| CN | 107168977(A) | 9/2017 |
| CN | 107580023 A | 1/2018 |

OTHER PUBLICATIONS

Translation of Written Opinion dated Jun. 21, 2019, from corresponding PCT Application No. PCT/CN2019/078418, 4 pages.
Extended European Search Report dated Dec. 2, 2021 for European Patent Application No. 19775405.4, 11 pages.
Translation of CN first Office Action dated Nov. 9, 2022, from corresponding CN Application No. 201810268968.0, 14 pages.

* cited by examiner

DATA QUERY METHOD, APPARATUS AND DEVICE

CROSS REFERENCE TO RELATED APPLICATIONS

This application claims priority to and is a continuation of PCT Patent Application No. PCT/CN2019/078418, filed on 18 Mar. 2019 and entitled "Data Query Method, Apparatus and Device," which claims priority to Chinese Patent Application No. 201810268968.0, filed on 29 Mar. 2018 and entitled "Data Query Method, Apparatus and Device," which are incorporated herein by reference in their entirety.

TECHNICAL FIELD

The present disclosure relates to the technical field of the Internet, and, more particularly, to data query methods, apparatuses and devices.

BACKGROUND

Open analytics provides serverless query analysis service for a user, performs any dimension of mass data analysis and query, and supports high concurrency, low latency (millisecond response), real-time online analysis, mass data query and other functions. An open analytics system may comprise a data source and a compute node; the data source stores mass data, and after receiving a query request, the compute node queries, from the data source, data corresponding to the query request.

However, under some application scenarios (such as a map data query scenario and an image data query scenario), the compute node might receive multiple query requests in a short time (i.e., concurrency is very high), and needs to process the multiple query requests in a short time. This situation causes abnormality of a CPU (Central Processing Unit) resource, a memory resource and/or network bandwidth, leading to query timeout or query failure.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a data query method, comprising obtaining resource overheads according to feature information of a received query request;

according to the resource overheads and a compute node resource, dynamically adjusting a compute node in a resource pool; and querying, by using the compute node, data corresponding to the query request.

The present disclosure provides a data query method, comprising:

according to feature information of a received query request, distributing the received query request to at least one allocation group, wherein different allocation groups correspond to different resource sub-pools;

according to feature information of the query request in an allocation group, obtaining resource overheads of the allocation group;

according to resource overheads of the allocation group and a compute node resource of a resource sub-pool that the allocation group corresponds, dynamically adjusting a compute node in the resource sub-pool; and querying, by using a compute node in the resource sub-pool, data corresponding to the query request in the allocation group.

The present disclosure provides a data query apparatus, comprising:

an obtaining module that obtains resource overheads according to feature information of a received query request;

a processing module that, according to the resource overheads and a compute node resource, dynamically adjusts a compute node in a resource pool; and a query module that queries, by using the compute node, data corresponding to the query request.

The present disclosure provides a data query apparatus, comprising:

a distributing module that, according to feature information of a received query request, distributes the received query request to at least one allocation group, wherein different allocation groups correspond to different resource sub-pools;

an obtaining module that, according to feature information of a query request in an allocation group, obtains resource overheads of the allocation group;

a processing module that, according to resource overheads of the allocation group and a compute node resource of a resource sub-pool that the allocation group corresponds, dynamically adjusts a compute node in the resource sub-pool; and a query module that queries, by using a compute node in the resource sub-pool, data corresponding to a query request in the allocation group.

The present disclosure provides a data query device, comprising: a processor that obtains resource overheads according to feature information of a received query request; according to the resource overheads and a compute node resource, dynamically adjusts a compute node in a resource pool; and queries, by using the compute node, data corresponding to the query request.

The present disclosure provides a data query device, comprising: a processor that, according to feature information of a received query request, distributes the received query request to at least one allocation group, wherein different allocation groups correspond to different resource sub-pools; according to feature information of a query request in an allocation group, obtains resource overheads of the allocation group; according to resource overheads of the allocation group and a compute node resource of a resource sub-pool that the allocation group corresponds, dynamically adjusts a compute node in the resource sub-pool; and queries, by using a compute node in the resource sub-pool, data corresponding to a query request in the allocation group.

Based on the foregoing technical solution, in an embodiment of the present disclosure, resource overheads may be obtained according to feature information of a received query request, and a compute node in a resource pool is dynamically adjusted according to the resource overheads and a compute node resource. Thus the compute node in the resource pool may process all the received query requests, and the processing efficiency and a resource utilization rate of the compute node are more effectively improved, such that the compute node may more efficiently perform parallel processing on the multiple query requests, and the utilization rates of a CPU resource, a memory resource and a network bandwidth resource are increased, thus achieving a better effect from the perspectives of an overall computing resource and a user query load and improving the usage experience of a user. Further, by using dynamically adjusting a compute node in a resource pool, each compute node may provide serverless query analysis service for a user, so that the user does not need to perceive a server or a service instance, and only needs to perceive a service per se provided by cloud service. Based on cloud service, the user only needs to input an SQL query request in order that a compute node may perform data query and analysis in a data source, and commercial analysis tools and applications (APPs) may be seamlessly integrated. Resources are intelligently analyzed and automatically adjusted, and resource utilization rates and price/performance ratios of cloud databases and cloud data analysis service clusters are raised more effectively.

BRIEF DESCRIPTION OF THE DRAWINGS

In order to more clearly describe embodiments of the present disclosure, the accompanying drawings used in the description of the embodiments of the present disclosure will be briefly introduced. Apparently, the accompanying drawings in the following description are only some embodiments described in the present disclosure, and those of ordinary skill in the art may obtain other drawings according to these accompanying drawings of the embodiments of the present disclosure.

DETAILED DESCRIPTION

The terms used in the present disclosure are only for the purpose of describing specific embodiments and not intended to limit the present disclosure. The singular forms "one," "the" and "this" used in the present disclosure and in the attached claims also are intended to cover plural forms unless their meanings are otherwise clearly expressed in the context. It should also be understood that the term "and/or" used in the text refers to any possible combination containing any one or a plurality of the listed items.

It should be understood that although the present disclosure might use terms such as first, second and third to describe various kinds of information, the information should not be limited to these terms. These terms are only intended to differentiate information of a same type. For example, without departing from the scope of the present disclosure, first information may also be referred to as second information, and similarly, second information may also be referred to as first information. Subject to the context, the term "if" used here may be interpreted as "at the time of . . . ," or "when . . . ," or "in response to determination."

An embodiment of the present disclosure provides a data query method, which may be applied in a system comprising a client, a load balancer, a front node (may also be referred to as "front end server"), a compute node (may also be referred to as "computer server") and a data source, such as a system for achieving Open Analytics. Of course, other servers may be comprised further, such as a resource scheduling server, and no limitation is set to this.

Figure 1:
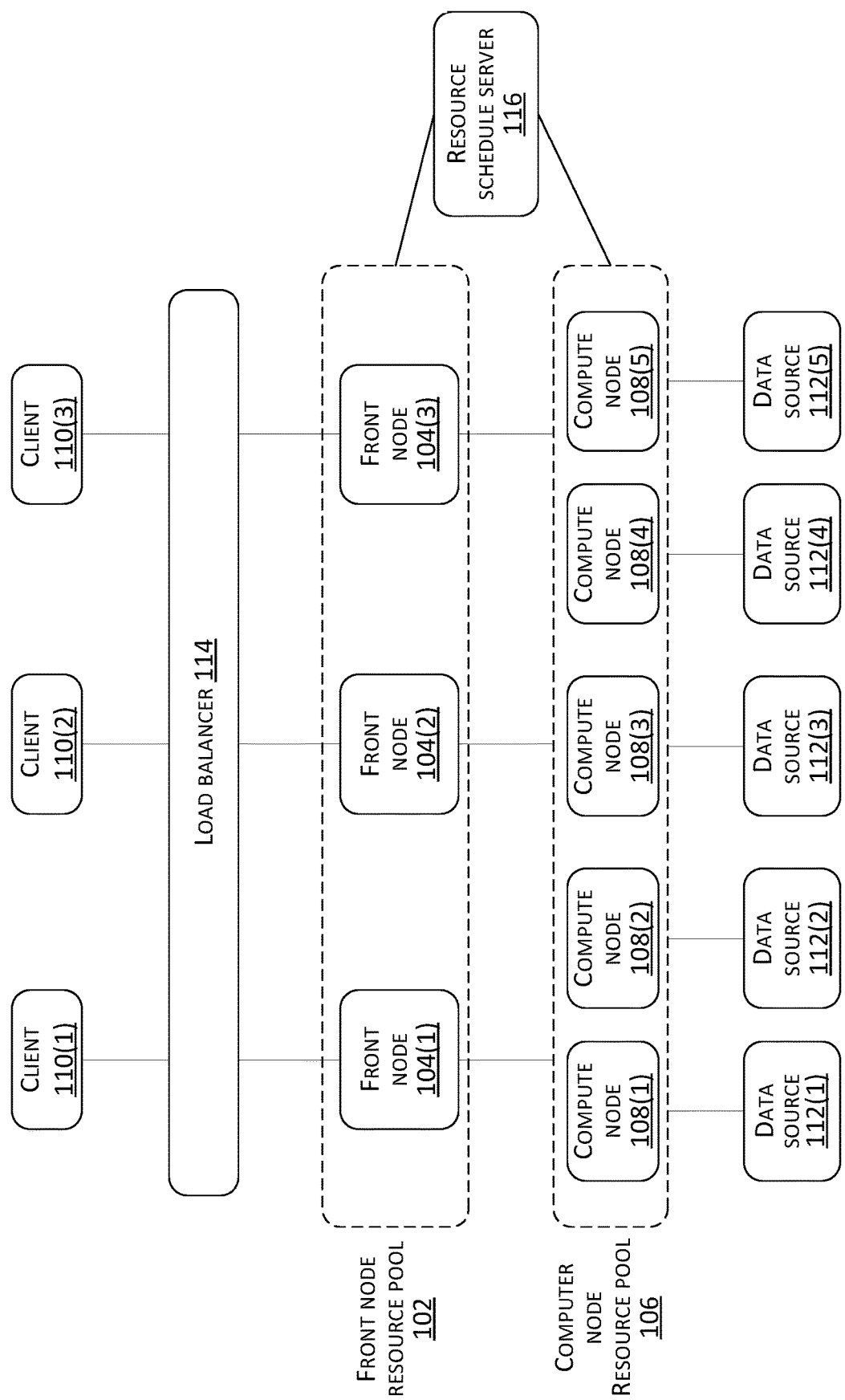
FIG. 1 is a schematic diagram of a system structure in an implementation manner of the present disclosure.

FIG. 1 shows a schematic diagram of an application scenario of an embodiment of the present disclosure. In a front node resource pool 102, there is one or a plurality of front nodes 104 (FIG. 1 shows 3 front nodes 104(1), 104(2), 104(3) as an example). In a compute node resource pool 106, there is one or a plurality of compute nodes 108 (FIG. 1 shows 5 compute nodes 108(1), 108(2), 108(3), 108(4), 108(5) as an example). In practical application, front nodes 104 may be increased (increase the number of front nodes) or reduced (reduce the number of front nodes), and compute nodes 108 also may be increased (increase the number of compute nodes) or reduced (reduce the number of compute nodes). This embodiment is a solution for increasing or reducing compute nodes.

Here, the client such as the client 110(1), 110(2), 110(3) is used to query data from a data source such as the data source 112(1), 112(2), 112(3), 112(4), 112(5), which for example may be an APP (Application) that a terminal device (such as a PC (Personal Computer), notebook or mobile terminal) comprises, or may be a browser that a terminal device comprises. No limitation is set to the type of the client.

Here, the load balancer 114 is used to perform load balancing of query requests, for example, after a great many query requests are received, these query requests may be load-balanced to front nodes. No limitation is set to this process. The resource schedule server 116 schedules the resources between the front node 104 and the compute node 108.

Here, the data source is used to store various kinds of data, and may provide data stored in the data source to a client. Embodiments of the present disclosure have no limitation to the type of data stored in the data source, for example the data may be user data, commodity data, map data, video data, image data or audio data.

Here, the plurality of front nodes 104 in the resource pool are used to provide the same function. For example, a front node is used to receive a query request sent by a client, perform SQL (Structured Query Language) parse of the query request, generate a query request by using the SQL parse result, and send the query request to a compute node, and the query request is used to request for data corresponding to the query request. Then, the front node is further used to receive data returned by a compute node and send the data to a client.

Here, the plurality of compute nodes 108 in the resource pool are used to provide the same function. For example, a compute node is used to receive a query request sent by a front node, use the query request to read data corresponding to the query request from a data source, without limitation to this reading process, and send the data to a front node.

In an example, if a compute node receives a great many query requests in a short time (i.e., concurrency is very high), then the compute node needs to process a great many query requests in a short time, causing abnormality of a CPU resource, a memory resource and/or network bandwidth, leading to query timeout or query failure. Different from the foregoing method, in an embodiment of the present disclosure, compute nodes in a resource pool may be adjusted dynamically, that is to say, when there are a great many query requests, the number of compute nodes in the resource pool may be increased to reduce the number of query requests per compute node, so that processing a great many query requests in a short time by a specific compute node may be avoided, the processing efficiency and a resource utilization rate of the compute node are more effectively improved, and the occupation of a CPU resource, a memory resource and network bandwidth may be reduced, thus improving processing performance, avoiding query timeout or failure of a client and improving the usage experience of a user.

Figure 2:
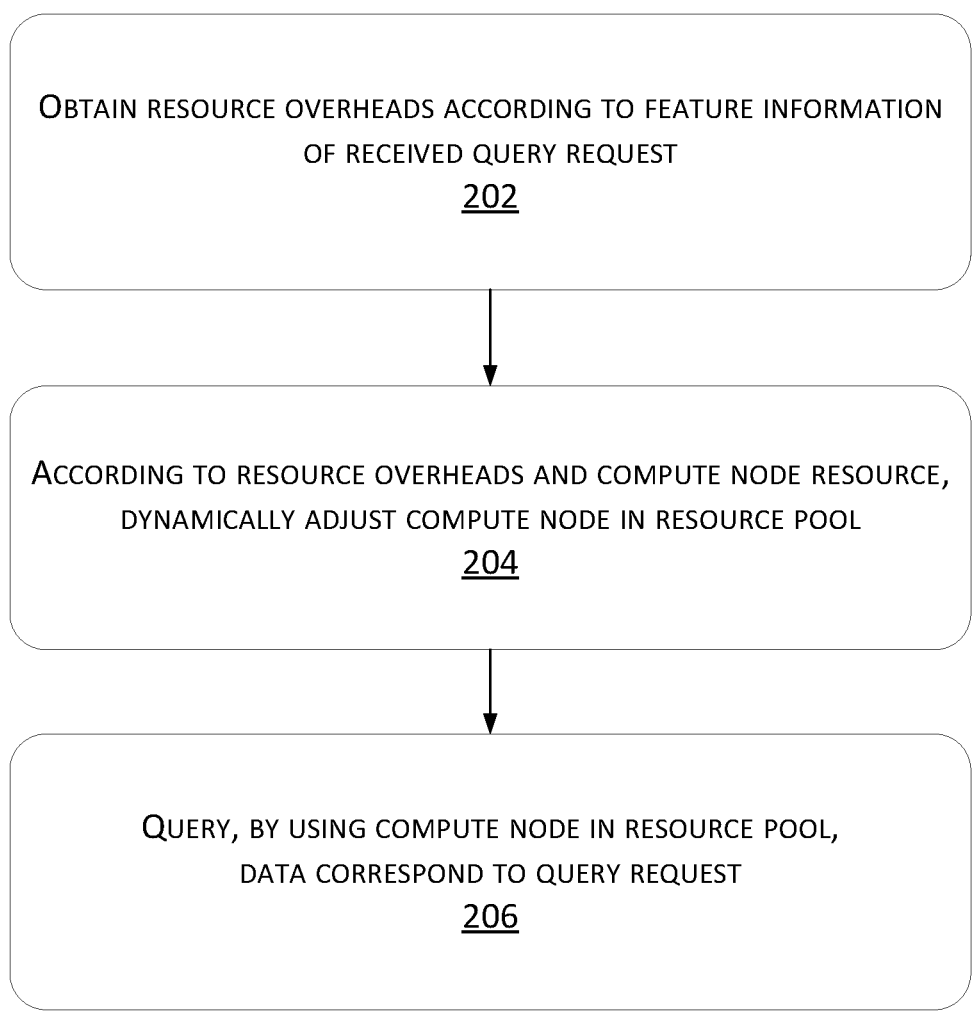
FIG. 2 is a flow diagram of a data query method in an implementation manner of the present disclosure.

Under the foregoing application scenario, FIG. 2 shows a schematic diagram of a flow of a data query method provided in an embodiment of the present disclosure. This method may be applied in a data query device. The data query device may be a load balancer, a front node, or a resource scheduling server in FIG. 1. No limitation is set to this. In this embodiment, taking application in a front node as an example, this method may comprise the following steps:

Step 202, obtaining resource overheads according to feature information of a received query request. For example, resource overheads may be obtained according to feature information of a query request received in a preset time window.

Step 204, according to the resource overheads and a compute node resource, dynamically adjusting a compute node in a resource pool.

Step 206, querying, by using the compute node in the resource pool, data corresponding to the query request.

The foregoing implementation sequence is just an example given for convenience of description. In practical application, the implementation sequence among steps may be changed, and is not limited. Further, in other embodiments, it is not necessary to implement steps of a corresponding method according to the sequence shown and described in the Description and the method may include more or fewer steps than those described in the Description. Further, a single step described in the Description may be divided into multiple steps to be described in other embodiments, and multiple steps described in the Description may be combined into a single step to be described in other embodiments.

Here, when a client needs to request for data in a data source, the client may send a query request. After a load balancer receives this query request, the load balancer may send the query request to a front node. After the front node receives the query request, the front end may store the query request in a query queue.

Here, a front node may set a preset time window, and the time of the preset time window may be configured according to experience, 3 s for example. Based on this, the front node may determine all query requests stored in the query queue in the preset time window as query requests received in the preset time window, 100 query requests for example.

Before implementation of Step 202, for all query requests received in the preset time window, feature information of each of the query requests may be obtained at first, too. The feature information may include without limitation one of the following options or any combination thereof: concurrency, query complexity, query data scanned, query response time and resource utilization.

I. concurrency, i.e., number of query requests received in a preset time window, such as 100.

II. Query complexity, i.e., complexity for implementation of a query request, which may express query response time, CPU resource occupancy, memory resource occupancy, network bandwidth occupancy, etc. Here, query complexity normally is a value, which may be obtained by normalizing query response time, CPU resource occupancy, memory resource occupancy and network bandwidth occupancy. For example, if a large amount of CPU resource, memory resource and network bandwidth need to be occupied and query response time is long when a query request 1 is implemented, then query complexity of the query request 1 is high. If a small amount of CPU resource, memory resource and network bandwidth need to be occupied and query response time is short when a query request 2 is implemented, then query complexity of the query request 2 is low.

For query requests having the same query keyword, they have the same or similar query complexity values. Therefore, correspondences between query keywords and complexity values may be obtained, and recorded in a first mapping table. For example, supposing a query request 1 and a query request 2 are both query requests having a query keyword A, then query complexity values of the query request 1 and the query request 2 are the same. Supposing that a correspondence between a query keyword A and a complexity value A is recorded in the first mapping table, then for the query request 1 and the query request 2, query complexity of the query request 1 and query complexity of the query request 2 are both the complexity value A.

Here, obtaining a correspondence between a query keyword and a complexity value may include without limitation: configuring a correspondence between a query keyword and a complexity value according to experience; or, training a correspondence between a query keyword and a complexity value by using a neutral network (no limitation is set to this training process); or, obtaining a query keyword of a query request and a complexity value of the query keyword when the query request is implemented. If 1 core of CPU resource and 100 M of memory resource are consumed when the query request is implemented then the complexity value is a complexity value that 1 core of CPU resource and 100 M of memory resource correspond to. No limitation is set to this.

In an example, query requests may include without limitation SQL query requests; and a query keyword may include without limitation any one of the following options or any combination thereof: keyword of join (i.e., join. Example: An SQL query request includes a keyword "join"), keyword for grouping result sets (i.e., groupby. Example: An SQL query request includes a keyword "groupby"), keyword for ordering result sets (i.e., orderby. Example: An SQL query request includes a keyword "orderby"), keyword setting for difference (i.e., distinct. Example: An SQL query request includes a keyword "distinct"), keyword for calculation of line number (i.e., count. Example: An SQL query request includes a keyword "count") and keyword for window function (i.e., window. Example: An SQL query request includes a keyword "window").

Table 1 gives an example of a first mapping table, which records correspondences between query keywords and complexity values. The complexity values here reflect complexities of query requests. For example, a complexity value 5 means that 1 core of CPU resource and 100 M of memory resource are consumed, a complexity value 10 means that 2 cores of CPU resource and 200 M of memory resource are consumed, and the rest may be done in the same manner. Of course, Table 1 is just an example, and a complexity value corresponding to a query keyword is related to the actual condition, so no unnecessary details will be repeated.

TABLE 1

| Query keyword | Complexity value |
|---|---|
| join | Complexity value 5 |
| groupby | Complexity value 10 |
| orderby | Complexity value 8 |
| distinct | Complexity value 12 |
| count | Complexity value 6 |
| window | Complexity value 15 |

Further, for every query request received in a preset time window, in order to obtain query complexity of the query request, the following methods may be adopted: Method 1: obtaining a query keyword from the query request, querying a first mapping table by using the query keyword to obtain a complexity value corresponding to the query keyword, and determining the complexity value as query complexity that the query request corresponds. Method 2: obtaining a query keyword from a plurality of subqueries of the query request, querying a first mapping table by using each obtained query keyword to obtain a complexity value corresponding to each query keyword; then the sum of the obtained complexity values (i.e., sum of all complexity values) may be determined as query complexity that the query request corresponds.

For example, in Method 1, supposing that a query request is a join statement of SQL, i.e., the query request comprises a query keyword "join," then the first mapping table shown in Table 1 may be queried by using the query keyword "join," to obtain a complexity value 5, and then it may be determined that the query complexity that the query request corresponds is the complexity value 5.

In Method 2, suppose that a query request comprises a subquery 1, a subquery 2 and a subquery 3; the subquery 1 is a join statement of SQL, the subquery 2 is a groupby statement of SQL, and the subquery 3 is a distinct statement of SQL. The subquery 1 comprises a query keyword "join," and the first mapping table shown in Table 1 is queried by using the query keyword "join," to obtain a complexity value 5; the subquery 2 comprises a query keyword "groupby," and the first mapping table shown in Table 1 is queried by using the query keyword "groupby," to obtain a complexity value 10; and the subquery 2 comprises a query keyword "distinct," and the first mapping table shown in Table 1 is queried by using the query keyword "distinct," to obtain a complexity value 12. Then, it may be determined that the query complexity that the query request corresponds is sum of the complexity value 5, the complexity value 10 and the complexity value 12, i.e., query complexity is a complexity value 27.

III. query data scanned, i.e., a data size returned during implementation of a query request. For example, supposing that a query request 1 is used to request for data A, and the size of the data A is 10 M, then query data scanned may be 10 M, in other words, data returned to a client is 10 M.

In an example, historical data may be collected, and a correspondence between a data ID and query data scanned is obtained according to the historical data; then, in a second mapping table, the correspondence between the data ID and the query data scanned is recorded. For example, when a query request is implemented, if the query request is used to request for data A, and the size of the data A is 10 M, then a front node may collect the foregoing information (i.e., historical data), obtain a correspondence between the data A and query data scanned 100, and record the correspondence in the second mapping table. Please refer to Table 2, which shows an example of a second mapping table. No limitation is set to the content of the second mapping table.

TABLE 2

| Data ID | query data scanned |
|---|---|
| Data A | 10M |
| Data B | 20M |

Further, for every query request received in a preset time window, in order to obtain query data scanned of the query request, the following method may be adopted: querying a second mapping table by using a data ID of the query request, to obtain query data scanned corresponding to the data ID. For example, if a data ID carried by the query request is data A, then query data scanned 10 M corresponding to the data A is determined. If a data ID carried by the query request is data C, as the second mapping table does not record query data scanned 10 M that the data C corresponds to, then query data scanned that the data C corresponds to may be set as a default value (it may be configured according to experience, 5 M for example).

IV. query response time, i.e., time spent in implementing a query request (time spent from start of processing of the query request to end of processing of the query request). For example, supposing that 3 s is spent when a query request 1 is implemented, then query response time is 3 s.

Here, historical data may be collected, and a correspondence between a data ID and query response time is obtained according to the historical data, and in a second mapping table, the correspondence between the data ID and the query response time is recorded. For every query request received in a preset time window, in order to obtain query response time of the query request, the following method may be adopted: querying a second mapping table by using a data ID of the query request to obtain query response time corresponding to the data ID.

V. resource utilization, i.e., resource consumed when a query request is implemented, such as memory utilization, CPU utilization and network bandwidth utilization. Supposing that 1 core of CPU resource, 100 M of memory resource and 100 M of network bandwidth are consumed when a query request 1 is implemented, then resource utilization is 1 core of CPU resource, 100 M of memory resource and 100 M of network bandwidth.

Here, historical data may be collected and a correspondence between a data ID and resource utilization is obtained according to the historical data. Then, the correspondence between the data ID and the resource utilization may be recorded in the second mapping table, too. Further, for every query request received in a preset time window, in order to obtain resource utilization of the query request, the following method may be adopted, too: querying the second mapping table by using a data ID of the query request, so that resource utilization corresponding to the data ID may be obtained.

In an example, a front node may also maintain a second mapping table shown in Table 3. The second mapping table records correspondences of data ID, query data scanned, query response time and resource utilization. Based on this, for every query request received in a preset time window, a second mapping table shown in Table 3 may be queried by using a data ID of the query request, thereby obtaining feature information corresponding to the data ID. The feature information may include one or a plurality of query data scanned, query response time and resource utilization.

TABLE 3

| Data ID | query data scanned | query response time | resource utilization |
|---|---|---|---|
| Data A | 10M | 3 s | CPU resource: 1 core; memory resource: 100M; network bandwidth: 100M |
| Data B | 20M | 6 s | CPU resource: 2 cores; memory resource: 200M; network bandwidth: 200M |

To sum up, if a data ID carried by the foregoing query request is data A, then query data scanned 10 M, query response time 3 s, and resource utilization "CPU resource: 1 core; memory resource: 100 M; network bandwidth: 100 M" corresponding to the data A are determined. Further, if a data ID carried by a query request is data C, as the second mapping table does not record the content that the data C corresponds to, then query data scanned may be set as a default value, query response time may be set as a default value and resource utilization is set as a default value. No limitation is set to this.

Through the foregoing process, feature information of every query request received in a preset time window may be obtained, taking feature information being concurrency, query complexity, query data scanned, query response time and resource utilization for example.

At Step 202, obtaining resource overheads according to feature information of a received query request, may comprise: for every query request received in a preset time window, obtaining a predicted resource amount of the query request according to feature information of the query request, and determining resource overheads according to a predicted resource amount of every query request. For example, resource overheads may be the sum of predicted resource amounts of all query requests.

Here, when a predicted resource amount of the query request is obtained according to feature information of the query request, supposing that the feature information is query complexity, then the larger the complexity value of the query complexity is, the larger the predicted resource amount will be, and the smaller the complexity value of the query complexity is, the smaller the predicted resource amount will be. No limitation is set to this determination process, as long as the foregoing law is complied with. Supposing that the feature information is query data scanned, then the larger the query data scanned is, the larger the predicted resource amount will be, and the smaller the query data scanned is, the smaller the predicted resource amount will be. No limitation is set to this determination process, as long as the foregoing law is complied with. Supposing that the feature information is query response time, then the larger the query response time is, the larger the predicted resource amount will be, and the smaller the query response time is, the smaller the predicted resource amount will be. No limitation is set to this determination process, as long as the foregoing law is complied with. Supposing that the feature information is resource utilization, then the larger the resource utilization is, the larger the predicted resource amount will be, and the smaller the resource utilization is, the smaller the predicted resource amount will be. No limitation is set to this determination process, as long as the foregoing law is complied with. Of course, the foregoing method has at least one example. No limitation is to this.

For example, when the feature information is a plurality of concurrency, query complexity, query data scanned, query response time and resource utilization, taking inclusion of the five features for example, the concurrency, query complexity, query data scanned, query response time and resource utilization may be normalized, in other words, the concurrency, query complexity, query data scanned, query response time and resource utilization are normalized to the same quantity level. No limitation is set to the way of this normalization. Supposing that normalized concurrency A, query complexity B, query data scanned C, query response time D and resource utilization E are obtained, then concurrency A, query complexity B, query data scanned C, query response time D and resource utilization E may be summated. The larger the summation result is, the larger the predicted resource amount will be, and the smaller the summation result is, the smaller the predicted resource amount will be. No limitation is set to this, as long as the foregoing law is complied with.

For another example, weight 1*concurrency A, weight 2*query complexity B, weight 3*query data scanned C, weight 4*query response time D and weight 5*resource utilization E may be summated, too. The larger the summation result is, the larger the predicted resource amount will be, and the smaller the summation result is, the smaller the predicted resource amount will be. No limitation is set to this, as long as the foregoing law is complied with. Here, weight 1, weight 2, weight 3, weight 4 and weight 5 all may be configured according to experience and no limitation is set to this. For example, the sum of weight 1, weight 2, weight 3, weight 4 and weight 5 may be 1, and of course, may be other values, such as 2 or 3.

In an example, obtaining a predicted resource amount of the query request according to feature information of the query request, may comprise analyzing feature information of the query request by using a prediction model to obtain a predicted resource amount of the query request. The prediction model may include without limitation: Holt-Winter (cubic exponential smoothing method) seasonal model, ARMA (Auto Regressive Moving Average) model, linear regression model and neural network model.

If we suppose the prediction model is a neural network model, then a neutral network may use historical data to train a correspondence between feature information and a predicted resource amount. For example, when feature information is query complexity, a correspondence between query complexity and a predicted resource amount may be trained. For example, when a query request is implemented, supposing the query complexity of the query request is a complexity value 5, and an actually consumed resource amount is a resource amount A, then a correspondence between the complexity value 5 and the predicted resource amount A may be obtained. Of course, a neutral network trains a correspondence between query complexity and a predicted resource amount by using a large amount of historical data, and no limitation is set to this training process. In the training result, the larger the complexity value of the query complexity is, the larger the predicted resource amount will be, and the smaller the complexity value of the query complexity is, the smaller the predicted resource amount will be. For concurrency, query data scanned, query response time, resource utilization and other feature information, their training processes are similar, so no unnecessary details will be repeated. When the feature information is a plurality of concurrency, query complexity, query data scanned, query response time and resource utilization, its training process is similar, so no unnecessary details will be repeated.

Further, after a neutral network trains a correspondence between feature information and a predicted resource amount, for every query request received in a preset time window, the neutral network may query the correspondence according to feature information of the query request and obtain a predicted resource amount of the query request. No limitation is set to this process.

Of course, the foregoing method is just an example of using a neural network model to obtain a predicted resource amount, and no limitation is set to this. When the prediction model is a Holt-Winter seasonal model, ARMA model or linear regression model, its implementation method is similar to the implementation method of the neural network model, so no unnecessary details will be repeated, as long as the determination process complies with the following law: the larger the complexity value of the query complexity is, the larger the predicted resource amount will be; the larger the query data scanned is, the larger the predicted resource amount will be; the larger the query response time is, the larger the predicted resource amount will be; the larger the resource utilization is, the larger the predicted resource amount will be; and the larger the concurrency is, the larger the predicted resource amount will be.

At Step 204, according to the resource overheads and a compute node resource, dynamically adjusting a compute node in a resource pool, may include without limitation: according to resource overheads and a compute node resource, obtaining number of compute nodes; and then, compute nodes matched with the number of the compute nodes may be distributed in the resource pool.

Here, according to the resource overheads and a compute node resource, obtaining the number of the compute nodes, may include without limitation the following method: the number of the compute nodes may be obtained by rounding up the resource overheads/compute node resource to an integer. Of course, other methods may be adopted too to obtain the number of the compute nodes as long as the number of the compute nodes is greater than or equal to the result of rounding up the resource overheads/compute node resource to an integer, and no limitation is set to this.

For example, when a sum of predicted resource amounts of all query requests received in a preset time window is 100 CPU cores, i.e., resource overheads is 100 CPU cores, supposing a compute node resource is 8 CPU cores (i.e., each compute node in a resource pool is provided with 8 CPU cores of compute node resource), then the number of compute nodes may be 13. Obviously, when the number of compute nodes is 13, as 13 compute nodes may provide 104 CPU cores, 13 compute nodes may satisfy resource overheads of 100 CPU cores, that is to say, 13 compute nodes may process all query requests received in the preset time window.

For another example, when resource overheads is 20 G memory, supposing a compute node resource is 2 G memory, then the number of compute nodes may be 10. Obviously, when the number of compute nodes is 10, as 10 compute nodes may provide 20 G memory, 10 compute nodes may satisfy resource overheads of 20 G memory, that is to say, 10 compute nodes may process all query requests received in the preset time window.

For another example, when resource overheads is 100 CPU cores and 20 G memory, and a compute node resource is 8 CPU cores and 2 G memory, then a CPU core resource needs to use 13 compute nodes, and a memory resource needs to use 10 compute nodes, so a maximum number 13 of compute nodes may be determined as the number of compute nodes.

Here, distributing compute nodes matched with the number of the compute nodes in the resource pool may comprise: if the number of compute nodes already existing in the resource pool is smaller than the number of the compute nodes, compute nodes may be increased in the resource pool so that the number of compute nodes after the increase is greater than or equal to the number of the compute nodes. If the number of compute nodes already existing in the resource pool is greater than the number of the compute nodes, compute nodes may be reduced in the resource pool so that the number of compute nodes after the reduction is greater than or equal to the number of the compute nodes.

For example, supposing that there have been 8 compute nodes in a resource pool, while the foregoing number of compute nodes is 13, then 5 compute nodes may be increased in the resource pool, so that there are 13 compute nodes in total in the resource pool, and these 13 compute nodes are used to process all query requests received in the preset time window.

For another example, supposing that there have been 20 compute nodes in a resource pool, while the foregoing number of compute nodes is 13, then 7 compute nodes may be reduced in the resource pool, so that there are 13 compute nodes in total in the resource pool, and these 13 compute nodes are used to process all query requests received in the preset time window.

In an example, after a front node obtains number 13 of compute nodes, the front node may send a resource increase or reduction order carrying number 13 of compute nodes to a resource scheduling server. After the resource scheduling server receives the resource increase or reduction order, the resource scheduling server may distribute compute nodes matched with the number 13 of compute nodes in the resource pool.

For example, if there is one front node, a resource scheduling server only receives a resource increase or reduction order carrying number 13 of compute nodes, so compute nodes are increased or reduced in a resource pool so that there are 13 compute nodes in the resource pool. For another example, if there are two front nodes, supposing that a resource scheduling server receives a resource increase or reduction order carrying number 13 of compute nodes and a resource increase or reduction order carrying number 8 of compute nodes, then compute nodes are increased or reduced in a resource pool so that there are 21 compute nodes in the resource pool.

Here, when a resource scheduling server increases/reduces compute nodes in a resource pool, the performance may be on a second scale (which even may be optimized to a 100 millisecond scale), in other words, in merely a few seconds (which may be optimized to a 100 millisecond scale), compute nodes may be increased or reduced in the resource pool.

At Step 206, querying, by using the compute node in the resource pool, data corresponding to the foregoing query request, may comprise: for every query request received in a preset time window, a front node may perform SQL parse of the query request, generate a query request by using the SQL parse result, and send the query request to a compute node; after the compute node receives the query request, the compute node may read data corresponding to the query request from a data source, perform calculation, and return the data to the front node; and the front node returns the received data to a client. For example, a front node splits a query request into 6 query subrequests (no limitation is set to this process), and load balances the 6 query subrequests to 6 compute nodes. For every compute node, after receiving a query request, the compute node reads data corresponding to the query subrequest from a data source, and returns the data to the front node. After the front node receives data corresponding to the 6 query subrequests, the data is combined to obtain a data set. The combined data set is data that the foregoing query request corresponds to. Then, the data set is sent to a client, eventually completing a data query operation.

Based on the foregoing technical solution, in an embodiment of the present disclosure, resource overheads may be obtained according to feature information of a received query request, the number of compute nodes is obtained according to resource overheads and a compute node resource, and compute nodes matched with the number of the compute nodes are distributed in the resource pool. In this way, a compute node in a resource pool may be dynamically adjusted, so that the compute node in the resource pool may process all the received query requests, and therefore, the processing efficiency and a resource utilization rate of the compute node are more effectively improved, such that the compute node may more efficiently perform parallel processing on the multiple query requests, and the utilization rates of a CPU resource, a memory resource and a network bandwidth resource are increased, thus achieving a better effect from the perspectives of an overall computing resource and a user query load and improving the usage experience of a user. By analyzing and predicting features of a query request, a resource of a compute node may be intelligently analyzed and automatically adjusted, and resource utilization rates and price/performance ratios of cloud databases and cloud data analysis service clusters are raised more effectively. Further, by using dynamically adjusting a compute node in a resource pool, each compute node may provide serverless query analysis service for a user, so that the user does not need to perceive a server or a service instance, and only needs to perceive a service per se provided by cloud service, and based on cloud service, the user only needs to input an SQL query request in order that a compute node may perform data query and analysis in a data source, and commercial analysis tools and applications (APPs) may be seamlessly integrated.

Figure 3:
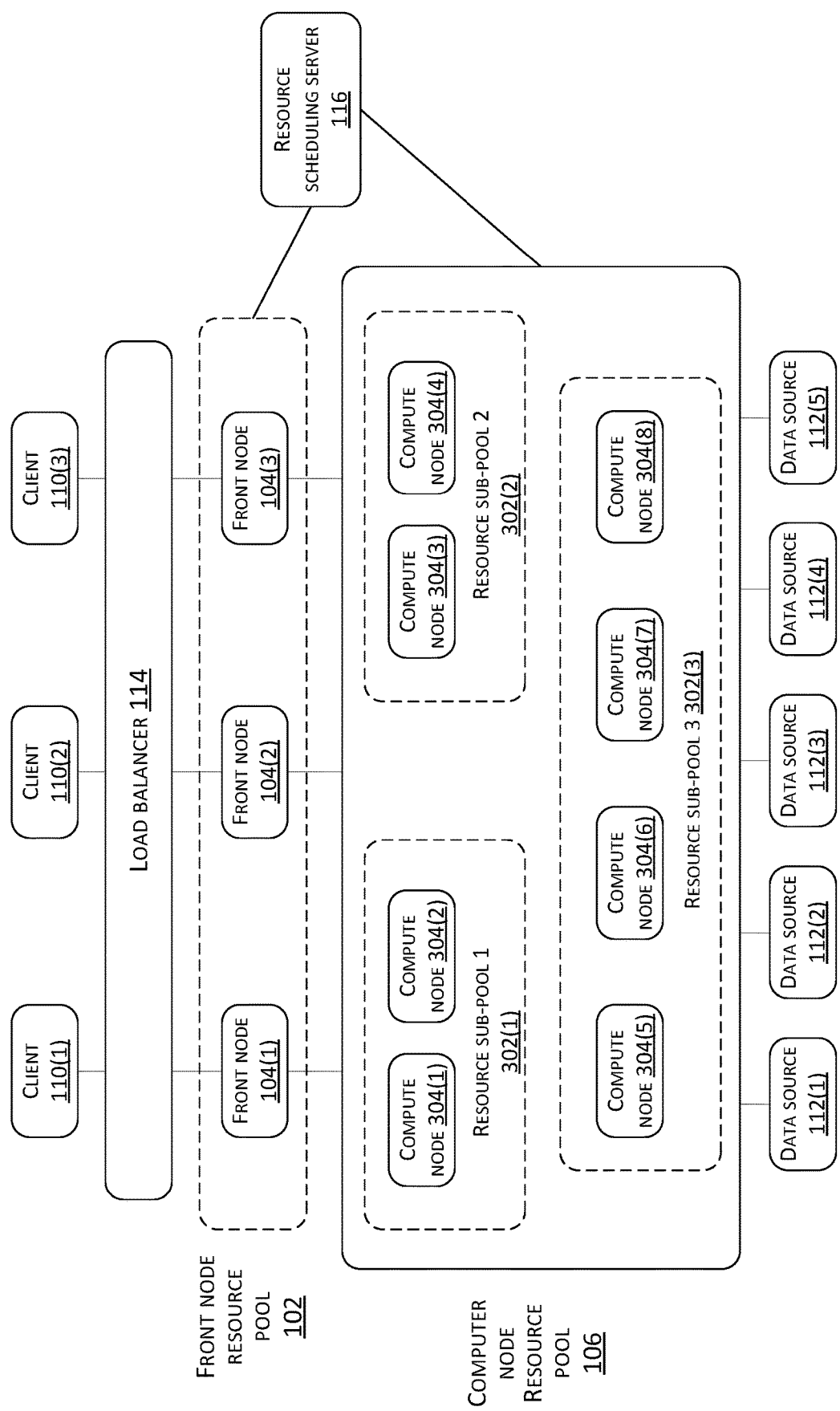
FIG. 3 is a schematic diagram of a system structure in another implementation manner of the present disclosure.

Please refer to FIG. 3, which is a schematic diagram of another application scenario of an embodiment of the present disclosure. Below the differences of FIG. 3 from FIG. 1 are described. In FIG. 1, all compute nodes are in the same resource pool, while in FIG. 3, the resource pool of the compute nodes may be divided into a plurality of resource sub-pools, taking a resource sub-pool 1 302(1), a resource sub-pool 2 302(2) and a resource sub-pool 3 302(3) for example, while the compute nodes 304 are located in the resource sub-pools. For example, the resource sub-pool 1 302(1) comprises 2 compute nodes 304(1) and 304(2), the resource sub-pool 2 302(2) comprises 2 compute nodes 304(3) and 304(4), and the resource sub-pool 3 comprises 4 compute nodes 304(5), 304(6), 304(7), and 304(8). In this embodiment, compute nodes in the resource sub-pools other than in the resource pool are increased or reduced.

For example, for the same resource sub-pool, compute node resources of all compute nodes 304 are the same; for different resource sub-pools, compute node resources of compute nodes may be same or different. For example, a compute node resource of compute nodes in the resource sub-pool 1 is 4 CPU cores, a compute node resource of compute nodes in the resource sub-pool 2 is 8 CPU cores, and a compute node resource of compute nodes in the resource sub-pool 3 is 16 CPU cores.

Here, according to the requirements of different users, resource sub-pools at different levels may be divided for different users. For example, based on user's SLA (Service-Level Agreement, i.e., a contract between a network service supplier and a user, which defines service type, service quality, customer payment and other terms) information, resource sub-pools at different levels may be divided for different users, thereby meeting the requirements of different users.

Figure 4:
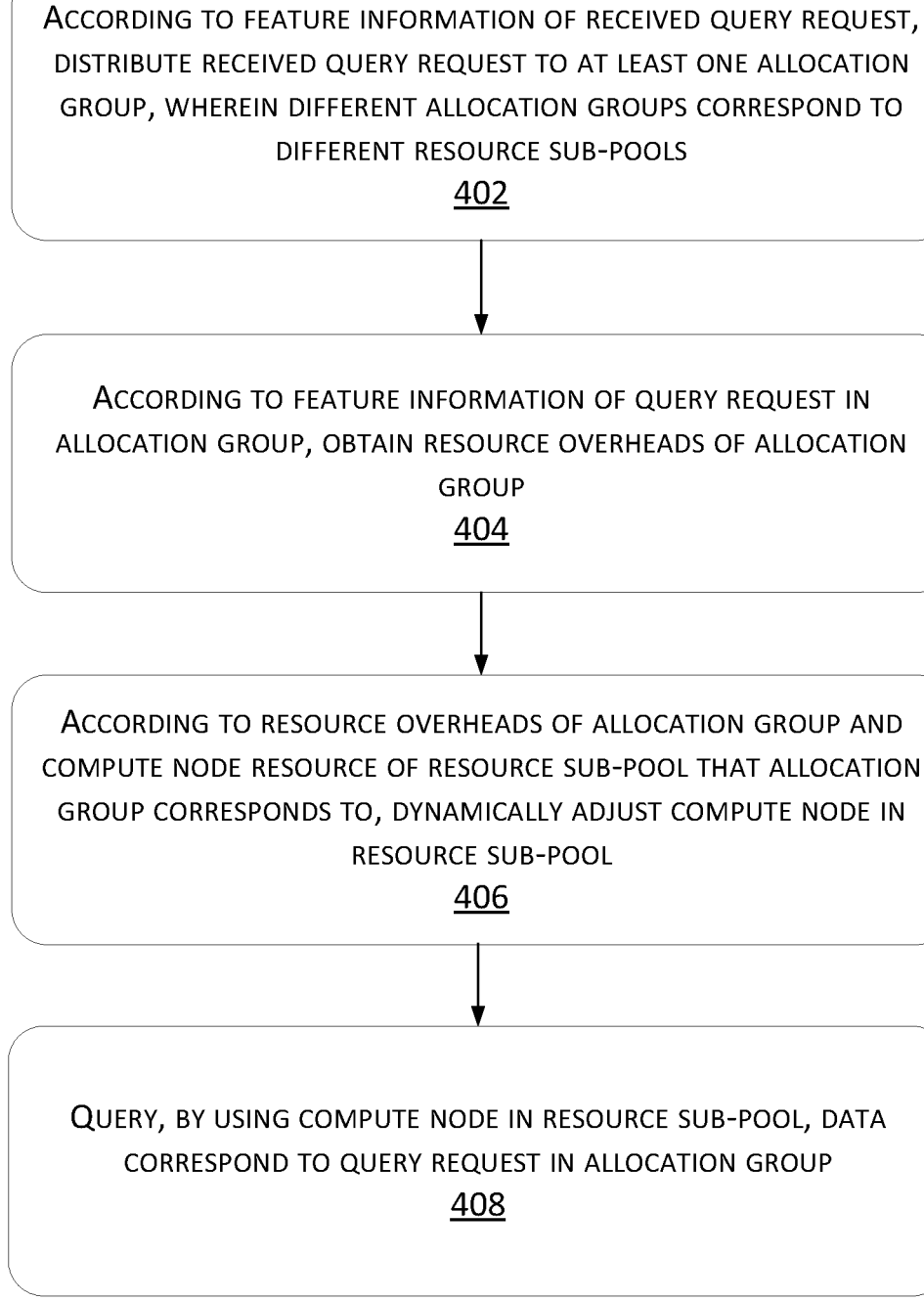
FIG. 4 is a flow diagram of a data query method in another implementation manner of the present disclosure.

Under the foregoing application scenario, FIG. 4 shows a schematic diagram of a flow of a data query method provided in an embodiment of the present disclosure. Taking application of this method in a front node as an example, this method may comprise the following steps:

Step 402, according to feature information of a received query request, distributing the received query request to at least one allocation group, wherein different allocation groups correspond to different resource sub-pools. For example, according to feature information of a query request received in a preset time window, distributing the received query request to at least one allocation group.

Step 404, according to feature information of a query request in an allocation group, obtaining resource overheads of the allocation group.

Step 406, according to resource overheads of the allocation group and a compute node resource of a resource sub-pool that the allocation group corresponds, dynamically adjusting a compute node in the resource sub-pool.

Step 408, querying, by using a compute node in the resource sub-pool, data corresponding to a query request in the allocation group, that is to say, different query requests may be distributed with compute nodes in different resource sub-pools.

In an example, the foregoing implementation sequence is just an example given for convenience of description. In practical application, the implementation sequence among steps may be changed, and is not limited. Further, in other embodiments, it is not necessary to implement steps of a corresponding method according to the sequence shown and described in the Description and the method may include more or fewer steps than those described in the Description. Further, a single step described in the Description may be divided into multiple steps to be described in other embodiments, and multiple steps described in the Description may be combined into a single step to be described in other embodiments.

Before implementation of Step 402, for all received query requests, feature information of each of the query requests may be obtained at first, too. The feature information may include without limitation one of the following options or any combination thereof: concurrency, query complexity, query data scanned, query response time and resource utilization. Here, a method for obtaining feature information may refer to the flow shown in FIG. 2, so no unnecessary details will be repeated.

At Step 402, according to feature information of a received query request, distributing the received query request to at least one allocation group, may include without limitation: for every received query request, a predicted resource amount of the query request may be obtained according to feature information of the query request, a resource interval that the predicted resource amount belongs to is determined, and the query request is distributed to an allocation group that the resource interval corresponds to; wherein different allocation groups may correspond to different resource intervals.

Here, a process for obtaining a predicted resource amount of a query request may be referred to Step 202, so no unnecessary details will be repeated.

Here, a resource interval that the predicted resource amount belongs to is determined, and the query request is distributed to an allocation group that the resource interval corresponds to may include without limitation: configuring a resource interval for every resource sub-pool in advance. No limitation is set to the allocation method. For example, when a compute node resource of a resource sub-pool is larger, a resource interval for the resource sub-pool may be larger; and when a compute node resource of a resource sub-pool is smaller, a resource interval for the resource sub-pool may be smaller. For example, if a compute node resource of a resource sub-pool 1 is 4 CPU cores, a compute node resource of a resource sub-pool 2 is 8 CPU cores, and a compute node resource of a resource sub-pool 3 is 16 CPU cores, then a resource interval for the resource sub-pool 1 is [0-1) CPU core, a resource interval for the resource sub-pool 2 is [1-2) CPU cores, and a resource interval for the resource sub-pool 3 is [2-infinite) CPU cores. Further, an allocation group may be further configured for each resource interval. For example, an allocation group 1 is configured for a resource interval of a resource sub-pool 1, an allocation group 2 is configured for a resource interval of a resource sub-pool 2, and an allocation group 3 is configured for a resource interval of a resource sub-pool 3. Obviously, the allocation group 1 corresponds to the resource sub-pool 1, the allocation group 2 corresponds to the resource sub-pool 2, and the allocation group 3 corresponds to the resource sub-pool 3.

Further, supposing that a predicted resource amount of a query request is 1 CPU core, then it may be determined that a resource interval that the predicted resource amount belongs to is a resource interval of a resource sub-pool 2, and the query request may be distributed to an allocation group 2. Obviously, after the foregoing processing is performed on all query requests received in a preset time window, these query requests may be distributed to all allocation groups. For example, query requests 1-10 are distributed to an allocation group 1, query requests 11-50 are distributed to an allocation group 2, and query requests 51-100 are distributed to an allocation group 3.

At Step 404, according to feature information of a query request in an allocation group, obtaining resource overheads of the allocation group, may comprise: for every query request in an allocation group, obtaining a predicted resource amount of the query request according to feature information of the query request, and according to the predicted resource amount, obtaining resource overheads of the allocation group.

Here, the implementation process of Step 404 may refer to Step 202. The difference is that: at Step 202, the processing is for all received query requests, while at Step 404, the processing is for all the query requests in an allocation group. Other processes are similar, so no unnecessary details will be repeated.

At Step 406, according to resource overheads of the allocation group and a compute node resource of a resource sub-pool that the allocation group corresponds, dynamically adjusting a compute node in the resource sub-pool, may comprise: according to resource overheads of the allocation group and a compute node resource of a resource sub-pool that the allocation group corresponds, obtaining the number of compute nodes in the resource sub-pool; and distributing compute nodes matched with the number of the compute nodes in the resource sub-pool.

Further, distributing compute nodes matched with the number of the compute nodes in the resource sub-pool, may comprise: if the number of already existing compute nodes in the resource sub-pool is smaller than the number of the compute nodes, compute nodes are increased in the resource sub-pool so that the number of compute nodes after the increase is greater than or equal to the number of the compute nodes; and if the number of compute nodes already existing in the resource sub-pool is greater than the number of the compute nodes, compute nodes may be reduced in the resource sub-pool so that the number of compute nodes after the reduction is greater than or equal to the number of the compute nodes.

Here, the implementation process of Step 406 may refer to Step 204. The difference is that: at Step 204, according to the resource overheads of all received query requests and a compute node resource, a compute node in a resource pool is dynamically adjusted, while at Step 406, according to resource overheads of the allocation group and a compute node resource of a resource sub-pool that the allocation group corresponds, a compute node in the resource sub-pool is dynamically adjusted.

For example, at Step 406, number 10 of compute nodes in a resource sub-pool 1 may be obtained according to resource overheads of an allocation group 1 and a compute node resource of the resource sub-pool 1, and 10 compute nodes are distributed in the resource sub-pool 1. Further, number 8 of compute nodes in a resource sub-pool 2 may be obtained according to resource overheads of an allocation group 2 and a compute node resource of the resource sub-pool 2, and 8 compute nodes are distributed in the resource sub-pool 1. Further, number 13 of compute nodes in a resource sub-pool 3 may be obtained according to resource overheads of an allocation group 3 and a compute node resource of the resource sub-pool 3, and 13 compute nodes are distributed in the resource sub-pool 3.

Here, the implementation process of Step 408 may refer to Step 206. The difference is that: at Step 206, a query request that the query request corresponds is sent a compute node of a resource pool, while at Step 408, a query request that a query request of an allocation group 1 corresponds to is sent to a compute node of a resource sub-pool 1, a query request that a query request of an allocation group 2 corresponds to is sent to a compute node of a resource sub-pool 2, and a query request that a query request of an allocation group 3 corresponds to is sent to a compute node of a resource sub-pool 3, so no unnecessary details will be repeated.

Figure 5:
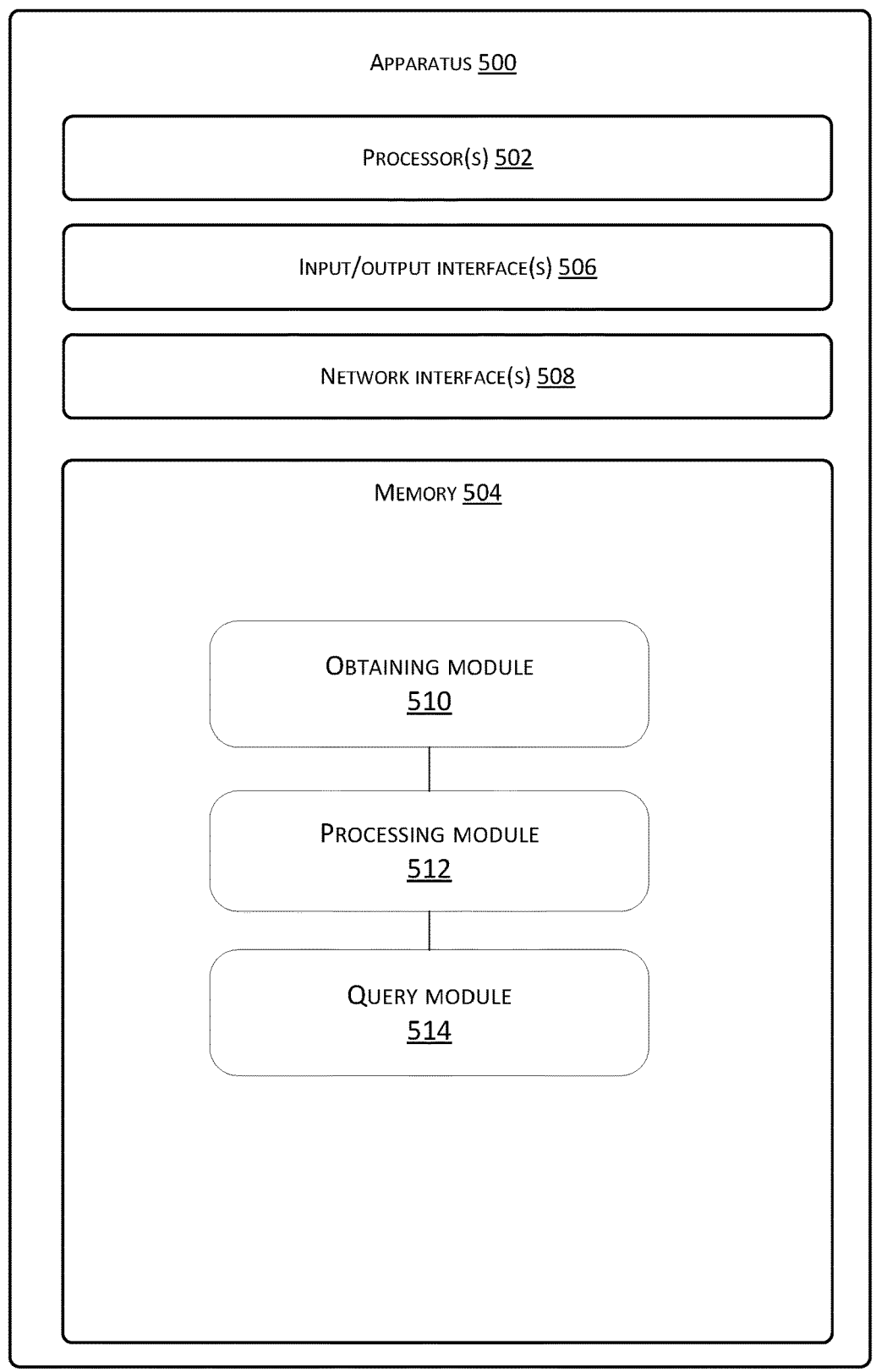
FIG. 5 is a structural diagram of a data query apparatus in an implementation manner of the present disclosure.

Based on an application conception same as the foregoing method, an embodiment of the present disclosure further provides a data query apparatus. FIG. 5 is a structural diagram of the apparatus 500. As shown in FIG. 5, the apparatus 500 includes one or more processor(s) 502 or data processing unit(s) and memory 504. The apparatus 500 may further include one or more input/output interface(s) 506 and one or more network interface(s) 508. The memory 504 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier. The memory 504 may store therein a plurality of modules or units including:

an obtaining module 510, for obtaining resource overheads according to feature information of a received query request; a processing module 502, for, according to the resource overheads and a compute node resource, dynamically adjusting a compute node in a resource pool; and a query module 514, for querying, by using the compute node, data corresponding to the query request.

In an example, the obtaining module 510 is further for: when feature information comprises query complexity, obtaining a query keyword from a query request; querying a first mapping table by using the query keyword to obtain a complexity value corresponding to the query keyword, and determining the complexity value as query complexity that the query request corresponds; or, obtaining a query keyword from a plurality of subqueries of a query request, querying a first mapping table by using the obtained query keyword to obtain a complexity value corresponding to the query keyword; determining the sum of the obtained complexity values as query complexity that the query request corresponds; wherein the first mapping table records correspondences between query keywords and complexity values.

Based on an application conception same as the foregoing method, an embodiment of the present disclosure provides a data query device, comprising a processor, for obtaining resource overheads according to feature information of a received query request; according to the resource overheads and a compute node resource, dynamically adjusting a compute node in a resource pool; and querying, by using the compute node, data corresponding to the query request.

Based on an application conception same as the foregoing method, an embodiment of the present disclosure further provides a machine-readable memory medium, which may be applied on a data query device. A number of computer instructions are stored on the machine readable memory medium; when the computer instructions are executed, the following processing is performed: obtaining resource overheads according to feature information of a received query request; according to the resource overheads and a compute node resource, dynamically adjusting a compute node in a resource pool; and querying, by using the compute node, data corresponding to the query request.

Figure 6:
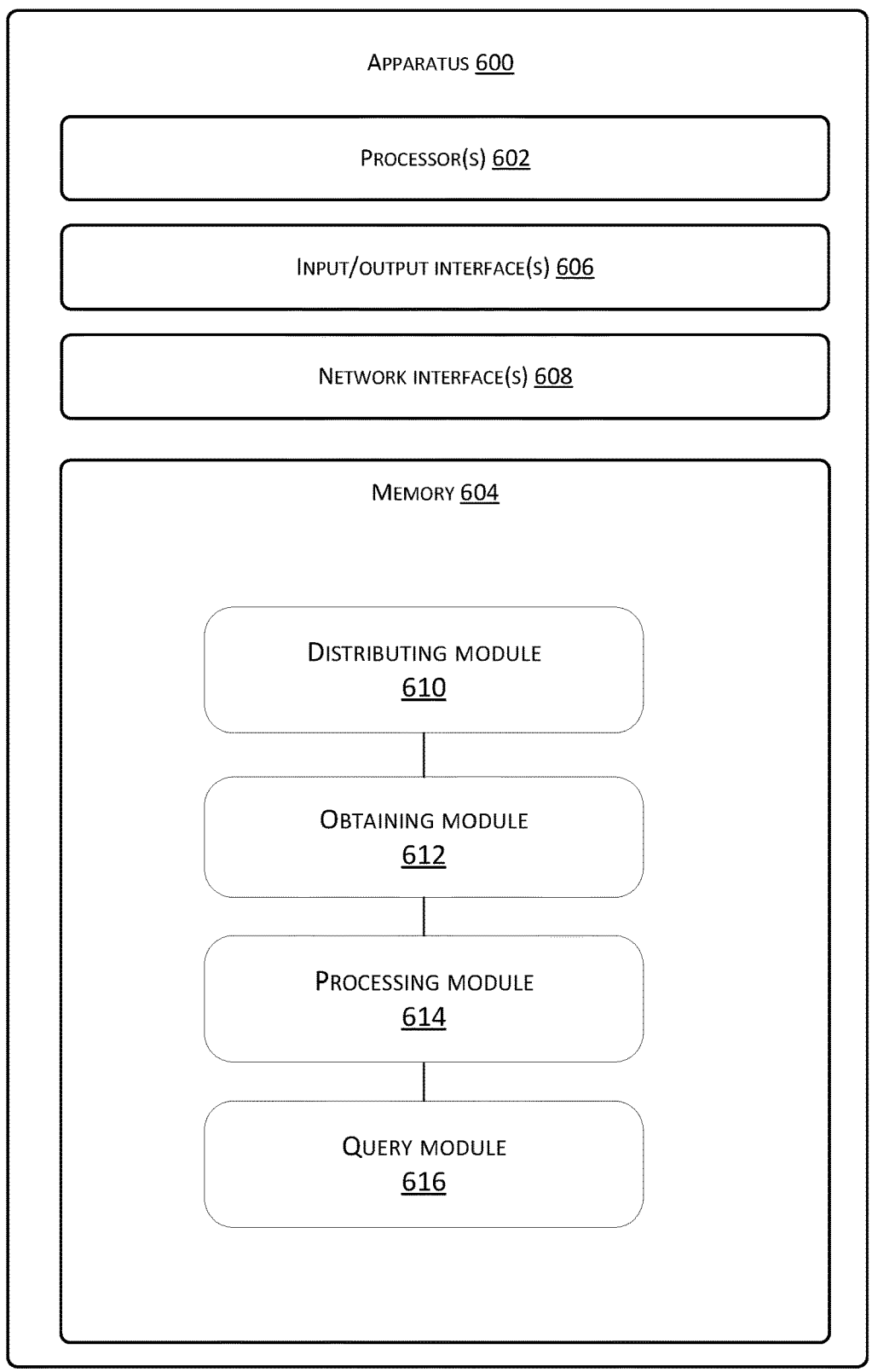
FIG. 6 is a structural diagram of a data query apparatus in another implementation manner of the present disclosure.

Based on an application conception same as the foregoing method, an embodiment of the present disclosure further provides a data query apparatus. FIG. 6 is a structural diagram of the apparatus 600. As shown in FIG. 6, the apparatus 600 includes one or more processor(s) 602 or data processing unit(s) and memory 604. The apparatus 600 may further include one or more input/output interface(s) 606 and one or more network interface(s) 608. The memory 604 is an example of computer readable media. The memory 604 may store therein a plurality of modules or units including:

a distributing module 610, for, according to feature information of a received query request, distributing the received query request to at least one allocation group; wherein different allocation groups correspond to different resource sub-pools; an obtaining module 612, for, according to feature information of a query request in an allocation group, obtaining resource overheads of the allocation group; a processing module 614, for, according to resource overheads of the allocation group and a compute node resource of a resource sub-pool that the allocation group corresponds, dynamically adjusting a compute node in the resource sub-pool; and a query module 616, for querying, by using a compute node in the resource sub-pool, data corresponding to a query request in the allocation group.

In an example, the distributing module 610 is used to: for a received query request, obtain a predicted resource amount of the query request according to feature information of the query request, and determine a resource interval that the predicted resource amount belongs to; and distribute the query request to an allocation group that the resource interval corresponds to; wherein different allocation groups correspond to different resource intervals.

Based on an application conception same as the foregoing method, an embodiment of the present disclosure provides a data query device, comprising a processor, for, according to feature information of a received query request, distributing the received query request to at least one allocation group; wherein different allocation groups correspond to different resource sub-pools; according to feature information of a query request in an allocation group, obtaining resource overheads of the allocation group; according to resource overheads of the allocation group and a compute node resource of a resource sub-pool that the allocation group corresponds, dynamically adjusting a compute node in the resource sub-pool; and querying, by using a compute node in the resource sub-pool, data corresponding to a query request in the allocation group.

Based on an application conception same as the foregoing method, an embodiment of the present disclosure further provides a machine-readable memory medium, which may be applied on a data query device. A number of computer instructions are stored on the machine readable memory medium; when the computer instructions are executed, the following processing is performed: according to feature information of a received query request, distributing the received query request to at least one allocation group; wherein different allocation groups correspond to different resource sub-pools; according to feature information of a query request in an allocation group, obtaining resource overheads of the allocation group; according to resource overheads of the allocation group and a compute node resource of a resource sub-pool that the allocation group corresponds, dynamically adjusting a compute node in the resource sub-pool; and querying, by using a compute node in the resource sub-pool, data corresponding to a query request in the allocation group.

The systems, apparatuses, modules or units described in the foregoing embodiments may be achieved by computer chips or entities, or by products possessing specific functions. A typical achieving device is a computer. Specific forms of the computer may be a personal computer (PC), laptop computer, cell phone, camera phone, smart phone, personal digital assistant, media player, navigational aid, e-mail transceiver, game console, tablet computer, wearable device or a combination of any few of these devices.

For convenience of description, when the foregoing apparatus is described, the apparatus is divided into a few units by function and the units are described respectively. Of course, when the present disclosure is implemented, the functions of the units may be achieved by putting the units in one or a plurality of software and/or hardware.

Those skilled in the art should understand that the embodiments of the present disclosure may be provided as methods, systems or computer program products, so the present disclosure may adopt embodiments in a form of entirely software, or entirely hardware, or a combination of software and hardware. Further, embodiments of the present disclosure may adopt a form of computer program product implemented on one or a plurality of computer-usable storage media (including but not limited to disk memory, CD-ROM and optical memory) that contain computer-usable program codes.

The present disclosure is described by referring to the flow charts and/or block diagrams of the methods, devices (systems) and computer program products according to the embodiments of the present disclosure. It should be understood that every flow and/or block in the flow charts and/or block diagrams, and the combination of the flows and/or blocks in the flow charts and/or block diagrams may be achieved through computer program instructions. These computer program instructions may be provided to a general-purpose computer, a special-purpose computer, an embedded processor, or the processor of any other programmable data processing equipment to generate a machine so that through the instructions executed by a computer or a processor of any other programmable data processing equipment, an apparatus for achieving the functions designated in one or a plurality of flows in the flow charts and/or one or a plurality of blocks in the block diagrams is generated.

Further, these computer program instructions may also be stored in a computer readable memory that may guide a computer or other programmable data processing equipment to work in a specific way so that the instructions stored in the computer readable memory generate a product comprising the instruction apparatus. The instruction apparatus achieves the functions designated in one or a plurality of flows in the flow charts and/or one or a plurality of blocks in the block diagrams.

These computer program instructions may also be loaded to a computer or other programmable data processing equipment so that a series of operating steps are executed on the computer or other programmable data processing equipment to generate the processing achieved by computer, thus the instructions executed on the computer or other programmable data processing equipment provide steps for achieving the functions designated in one or a plurality of flows in the flow charts and/or one or a plurality of blocks in the block diagrams.

The foregoing descriptions are example embodiments of the present disclosure and are not intended to limit the present disclosure. All modifications, identical replacements and improvements made without departing from the spirit and principle of the present disclosure shall fall within the scope of the present disclosure.

The present disclosure may further be understood with clauses as follows.

Clause 1. A data query method comprising:
obtaining resource overheads according to feature information of a received query request;
according to the resource overheads and a compute node resource, dynamically adjusting a compute node in a resource pool; and
querying, by using the compute node, data corresponding to the query request.

Clause 2. The method according to clause 1, wherein the feature information comprises one of following or a combination thereof: concurrency, query complexity, query data scanned, query response time and resource utilization.

Clause 3. The method according to clause 1, wherein before the obtaining the resource overheads according to the feature information of the received query request, the method further comprises:
if the feature information comprises a query complexity, obtaining a query keyword from the query request; and
querying a first mapping table by using the query keyword to obtain a complexity value corresponding to the query keyword, and determining the complexity value as query complexity that the query request corresponds,
wherein the first mapping table records correspondences between query keywords and complexity values.

Clause 4. The method according to clause 1, wherein before the obtaining the resource overheads according to the feature information of the received query request, the method further comprises:
if the feature information comprises a query complexity, obtaining a query keyword from a plurality of subqueries of the query request, querying a first mapping table by using the obtained query keyword to obtain a complexity value corresponding to the query keyword; and determining a sum of obtained complexity values as the query complexity that the query request corresponds,
the first mapping table records correspondences between query keywords and complexity values.

Clause 5. The method according to clause 3 or 4, wherein
the query request includes an SQL query request; and
the query keyword includes one of following or a combination thereof: join, groupby, orderby, distinct, count and window.

Clause 6. The method according to clause 1, wherein before the obtaining the resource overheads according to the feature information of the received query request, the method further comprises:
querying a second mapping table by using a data ID of the query request to obtain feature information corresponding to the data ID,
wherein:
the second mapping table records correspondences of data IDs and feature information; and
the feature information comprises one or a plurality of following including query data scanned, query response time and resource utilization.

Clause 7. The method according to clause 6, wherein before the querying the second mapping table by using the data ID of the query request to obtain feature information corresponding to the data ID, the method further comprises:
collecting historical data, and obtaining a correspondence between a data ID and feature information according to the historical data; and
recording a correspondence between the data ID and the feature information in the second mapping table.

Clause 8. The method according to clause 1, wherein the obtaining the resource overheads according to the feature information of the received query request comprises:
for the received query request, obtaining a predicted resource amount of the query request according to the feature information of the query request; and
determining the resource overheads according to the predicted resource amount of the query request.

Clause 9. The method according to clause 8, wherein the obtaining the predicted resource amount of the query request according to the feature information of the query request comprises:

analyzing the feature information of the query request by using a prediction model to obtain the predicted resource amount of the query request, wherein the prediction model includes: Holt-Winter seasonal model, ARMA model, linear regression model and neural network model.

Clause 10. The method according to clause 1, wherein the according to the resource overheads and the compute node resource, dynamically adjusting the compute node in a resource pool, comprises:

according to the resource overheads and the compute node resource, obtaining a number of compute nodes; and distributing compute nodes matched with the number of the compute nodes in the resource pool.

Clause 11. The method according to clause 10, wherein the distributing the compute nodes matched with the number of the compute nodes in the resource pool comprises:

if the number of compute nodes already existing in the resource pool is smaller than the number of the compute nodes, increasing compute nodes in the resource pool so that the number of compute nodes after the increase is greater than or equal to the number of the compute nodes; and if the number of compute nodes already existing in the resource pool is greater than the number of the compute nodes, reducing compute nodes in the resource pool so that the number of compute nodes after the reduction is greater than or equal to the number of the compute nodes.

Clause 12. A data query method comprising:

according to feature information of a received query request, distributing the received query request to at least one allocation group, different allocation groups corresponding to different resource sub-pools;

according to feature information of a query request in an allocation group, obtaining resource overheads of the allocation group;

according to resource overheads of the allocation group and a compute node resource of a resource sub-pool that the allocation group corresponds, dynamically adjusting a compute node in the resource sub-pool; and querying, by using a compute node in the resource sub-pool, data corresponding to a query request in the allocation group.

Clause 13. The method according to clause 12, wherein the feature information comprises one of following or a combination thereof: concurrency, query complexity, query data scanned, query response time and resource utilization.

Clause 14. The method according to clause 12, wherein before the distributing the received query request to at least one allocation group, the method further comprises:

if the feature information comprises a query complexity, obtaining a query keyword from the query request; and querying a first mapping table by using the query keyword to obtain a complexity value corresponding to the query keyword, and determining the complexity value as the query complexity that the query request corresponds, wherein the first mapping table records correspondences between query keywords and complexity values.

Clause 15. The method according to clause 12, wherein before the distributing the received query request to at least one allocation group, the method further comprises:

if the feature information comprises a query complexity, obtaining a query keyword from a plurality of subqueries of a query request;

querying a first mapping table by using the obtained query keyword to obtain a complexity value corresponding to the query keyword; and determining a sum of obtained complexity values as the query complexity that the query request corresponds, wherein the first mapping table records correspondences between query keywords and complexity values.

Clause 16. The method according to clause 14 or 15, wherein:

the query request includes: an SQL query request; and the query keyword includes one of following or a combination thereof: join, groupby, orderby, distinct, count and window.

Clause 17. The method according to clause 12, wherein before the distributing the received query request to at least one allocation group, the method further comprises:

querying a second mapping table by using a data ID of a query request to obtain feature information corresponding to the data ID, wherein:

the second mapping table records correspondences of data IDs and feature information; and the feature information comprises one or a plurality of following including query data scanned, query response time and resource utilization.

Clause 18. The method according to clause 17, wherein before the querying a second mapping table by using the data ID of the query request to obtain the feature information corresponding to the data ID, the method further comprises:

collecting historical data, and obtaining a correspondence between the data ID and feature information according to the historical data; and recording a correspondence between the data ID and the feature information in the second mapping table.

Clause 19. The method according to clause 12, wherein the according to the feature information of the received query request, distributing the received query request to at least one allocation group comprises:

for a received query request, obtaining a predicted resource amount of the query request according to feature information of the query request, and determining a resource interval that the predicted resource amount belongs to; and distributing the query request to the allocation group that the resource interval corresponds to, different allocation groups corresponding to different resource intervals.

Clause 20. The method according to clause 12, wherein the according to feature information of a query request in an allocation group, obtaining the resource overheads of the allocation group comprises:

for a query request in an allocation group, obtaining a predicted resource amount of the query request according to feature information of the query request, and determining resource overheads of the allocation group according to the predicted resource amount.

Clause 21. The method according to clause 19 or 20, wherein the obtaining the predicted resource amount of the query request according to the feature information of the query request comprises:

analyzing feature information of the query request by using a prediction model to obtain a predicted resource amount of the query request, wherein the prediction model includes Holt-Winter seasonal model, ARMA model, linear regression model and neural network model.

Clause 22. The method according to clause 12, wherein the according to resource overheads of the allocation group and the compute node resource of the resource sub-pool that the allocation group corresponds, dynamically adjusting the compute node in the resource sub-pool comprises:

according to the resource overheads of the allocation group and the compute node resource of the resource sub-pool that the allocation group corresponds, obtaining a number of compute nodes in the resource sub-pool; and distributing compute nodes matched with the number of the compute nodes in the resource sub-pool.

Clause 23. The method according to clause 22, wherein the distributing compute nodes matched with the number of the compute nodes in the resource sub-pool comprises:

if the number of compute nodes already existing in the resource sub-pool is smaller than the number of the compute nodes, increasing compute nodes in the resource sub-pool so that the number of compute nodes after the increase is greater than or equal to the number of the compute nodes; and;

if the number of compute nodes already existing in the resource sub-pool is greater than the number of the compute nodes, reducing compute nodes in the resource sub-pool so that the number of compute nodes after the reduction is greater than or equal to the number of the compute nodes.

Clause 24. A data query apparatus comprising:

an obtaining module that obtains resource overheads according to feature information of a received query request;

a processing module that, according to the resource overheads and a compute node resource, dynamically adjusts a compute node in a resource pool; and a query module that queries, by using the compute node, data corresponding to the query request.

Clause 25. The apparatus according to clause 24, wherein the obtaining module further:

if the feature information comprises a query complexity, obtains a query keyword from a query request; queries a first mapping table by using the query keyword to obtain a complexity value corresponding to the query keyword, and determines the complexity value as query complexity that the query request corresponds; or obtaining the query keyword from a plurality of subqueries of a query request; queries a first mapping table by using the obtained query keyword to obtain the complexity value corresponding to the query keyword; determining a sum of the obtained complexity values as the query complexity that the query request corresponds, wherein the first mapping table records correspondences between query keywords and complexity values.

Clause 26. A data query apparatus, applied in a front node, the apparatus comprises:

a distributing module that, according to feature information of a received query request, distributes the received query request to at least one allocation group; wherein different allocation groups correspond to different resource sub-pools;

an obtaining module that, according to feature information of a query request in an allocation group, obtains resource overheads of the allocation group;

a processing module that, according to resource overheads of the allocation group and a compute node resource of a resource sub-pool that the allocation group corresponds, dynamically adjusts a compute node in the resource sub-pool; and a query module that queries, by using a compute node in the resource sub-pool, data corresponding to a query request in the allocation group.

Clause 27. The apparatus according to clause 26, wherein the distributing module further:

for a received query request, obtains a predicted resource amount of the query request according to the feature information of the query request, and determines a resource interval that the predicted resource amount belongs to; and distributes the query request to the allocation group that the resource interval corresponds to, different allocation groups corresponding to different resource intervals.

Clause 28. A data query device comprising:

a processor that obtains resource overheads according to feature information of a received query request; according to the resource overheads and a compute node resource, dynamically adjusts a compute node in a resource pool; and queries, by using the compute node, data corresponding to the query request.

Clause 29. A data query device comprising:

a processor that, according to feature information of a received query request, distributes the received query request to at least one allocation group, different allocation groups corresponding to different resource sub-pools; according to feature information of a query request in an allocation group, obtains resource overheads of the allocation group; according to resource overheads of the allocation group and a compute node resource of a resource sub-pool that the allocation group corresponds, dynamically adjusts a compute node in the resource sub-pool; and queries, by using a compute node in the resource sub-pool, data corresponding to a query request in the allocation group.

What is claimed is:

1. A method comprising:
dividing a resource pool of computer nodes into a plurality of resource sub-pools at different levels;
determining feature information of a query request, the feature information including a query complexity of the query request;
according to the feature information of the query request, distributing the query request to at least one allocation group, different allocation groups corresponding to different resource sub-pools of the plurality of resource sub-pools;
according to the feature information of the query request in an allocation group, obtaining resource overheads of the allocation group;
according to the resource overheads and a compute node resource of a resource sub-pool that the allocation group corresponds, dynamically adjusting a compute node in the resource sub-pool; and
querying, by using the compute node in the resource sub-pool, data corresponding to the query request.

2. The method according to claim 1, wherein the feature information further comprises one of following or a combination thereof: concurrency, query data scanned, query response time, and resource utilization.

3. The method according to claim 1, wherein
the method further comprises:
obtaining a query keyword from a plurality of subqueries of the query request;
querying a first mapping table by using the obtained query keyword to obtain a complexity value corresponding to the query keyword; and
determining a sum of obtained complexity values as the query complexity that the query request corresponds.

4. The method according to claim 1, wherein:
the query request includes a structured query language (SQL) query request, and a query keyword includes one of following or a combination thereof: join, groupby, orderby, distinct, count, and window.

5. The method according to claim 1, wherein the method further comprises:
   querying a second mapping table by using a data identification (ID) of the query request to obtain feature information corresponding to the data ID,
   wherein:
   the second mapping table records correspondences of the data ID and the feature information corresponding to the data ID; and
   the feature information corresponding to the data ID comprises one or a plurality of following: query data scanned, query response time and resource utilization.

6. The method according to claim 5, wherein before the querying the second mapping table by using the data ID of the query request to obtain the feature information corresponding to the data ID, the method further comprises:
   collecting historical data, and obtaining a correspondence between the data ID and the feature information corresponding to the data ID according to the historical data; and
   recording the correspondence between the data ID and the feature information corresponding to the data ID in the second mapping table.

7. The method according to claim 1, wherein the obtaining the resource overheads comprises:
   for the query request, obtaining a predicted resource amount of the query request according to the feature information; and
   determining the resource overheads according to the predicted resource amount of the query request.

8. The method according to claim 7, wherein the obtaining the predicted resource amount of the query request according to the feature information further comprises:
   analyzing the feature information of the query request by using a prediction model to obtain the predicted resource amount of the query request, wherein the prediction model includes one of following: a Holt-Winter seasonal model, an auto regressive moving average (ARMA) model, a linear regression model, and a neural network model.

9. The method according to claim 1, wherein the dynamically adjusting the compute node in the resource sub-pool comprises:
   according to the resource overheads and the compute node resource, obtaining a number of compute nodes; and
   distributing compute nodes matched with the number of the compute nodes in the resource sub-pool.

10. The method according to claim 9, wherein the distributing the compute nodes matched with the number of the compute nodes in the resource sub-pool comprises:
    in response to determining that a number of compute nodes already existing in the resource sub-pool is smaller than the number of the compute nodes, increasing compute nodes in the resource pool so that a number of compute nodes after the increase is greater than or equal to the number of the compute nodes.

11. The method according to claim 9, wherein the distributing the compute nodes matched with the number of the compute nodes in the resource sub-pool comprises:
    in response to determining that the number of compute nodes already existing in the resource pool is greater than the number of the compute nodes, reducing compute nodes in the resource pool so that a number of compute nodes after the reduction is greater than or equal to the number of the compute nodes.

12. An apparatus comprising:
    one or more processors; and
    one or more memories storing thereon computer-readable instructions that, when executed by the one or more processors, cause the one or more processors to perform acts comprising:
    dividing a resource pool of computer nodes into a plurality of resource sub-pools at different levels;
    determining feature information of a query request, the feature information including a query complexity of the query request;
    according to the feature information of the query request, distributing the query request to at least one allocation group, different allocation groups corresponding to different resource sub-pools of the plurality of resource sub-pools;
    according to the feature information of the query request in an allocation group, obtaining resource overheads of the allocation group;
    according to resource overheads of the allocation group and a compute node resource of a resource sub-pool that the allocation group corresponds, dynamically adjusting a compute node in the resource sub-pool; and
    querying, by using the compute node in the resource sub-pool, data corresponding to the query request in the allocation group.

13. The apparatus according to claim 12, wherein the feature information further comprises one of following or a combination thereof: concurrency, query data scanned, query response time, and resource utilization.

14. The apparatus according to claim 12, wherein the acts further comprise:
    obtaining a query keyword from a plurality of subqueries of the query request;
    querying a first mapping table by using the obtained query keyword to obtain a complexity value corresponding to the query keyword; and
    determining a sum of obtained complexity values as the query complexity that the query request corresponds.

15. The apparatus according to claim 12, wherein before the distributing the query request to the at least one allocation group, the acts further comprise:
    querying a second mapping table by using a data identification (ID) of the query request to obtain feature information corresponding to the data ID,
    wherein:
    the second mapping table records correspondences of the data ID and the feature information corresponding to the data ID; and
    the feature information corresponding to the data ID comprises one or a plurality of following: query data scanned, query response time and resource utilization.

16. The apparatus according to claim 15, wherein before the querying the second mapping table by using the data ID of the query request to obtain the feature information corresponding to the data ID, the acts further comprise:
    collecting historical data, and obtaining a correspondence between the data ID and the feature information corresponding to the data ID according to the historical data; and
    recording the correspondence between the data ID and the feature information corresponding to the data ID in the second mapping table.

17. The apparatus according to claim 12, wherein the according to the feature information of the query request, distributing the query request to the at least one allocation group comprises:

for the query request, obtaining a predicted resource amount of the query request according to the feature information of the query request, and determining a resource interval that the predicted resource amount belongs to; and distributing the query request to the allocation group that the resource interval corresponds to, different allocation groups corresponding to different resource intervals.

18. One or more memories storing thereon computer-readable instructions that, when executed by one or more processors, cause the one or more processors to perform acts comprising:

dividing a resource pool of computer nodes into a plurality of resource sub-pools at different levels;

determining feature information of a query request, the feature information including a query complexity of the query request;

according to the feature information of the query request, distributing the query request to at least one allocation group, different allocation groups corresponding to different resource sub-pools of the plurality of resource sub-pools;

according to the feature information of the query request in an allocation group, obtaining resource overheads of the allocation group;

according to the resource overheads and a compute node resource of a resource sub-pool that the allocation group corresponds, dynamically adjusting a compute node in the resource sub-pool; and querying, by using the compute node in the resource sub-pool, data corresponding to the query request.

19. The one or more memories according to claim 18, wherein the feature information further comprises one of following or a combination thereof: concurrency, query data scanned, query response time, and resource utilization.

20. The one or more memories according to claim 18, wherein the acts further comprise:

obtaining the query keyword from a plurality of subqueries of the query request;

querying a first mapping table by using the obtained query keyword to obtain a complexity value corresponding to the query keyword; and determining a sum of obtained complexity values as the query complexity that the query request corresponds.

* * * * *